United States Patent [19]

Giocastro et al.

[11] Patent Number: 4,708,106
[45] Date of Patent: Nov. 24, 1987

[54] ACUTE ANGLE CRANKARM TRANSMITTING RECIPROCATING MOTION IN A ROTARY FASHION

[76] Inventors: Joseph Giocastro; Peter Giocastro; James Giocastro, all of 6428 Metropolitan Ave., Middle Village, N.Y. 11379

[21] Appl. No.: 882,781

[22] Filed: Jul. 7, 1986

Related U.S. Application Data

[63] Continuation of Ser. No. 519,106, Aug. 2, 1983, Pat. No. 4,622,932.

[51] Int. Cl.⁴ .............................................. F02B 75/32
[52] U.S. Cl. ................................. 123/197 AC; 74/595
[58] Field of Search ........ 123/197 R, 197 AC, 192 R, 123/192 B; 74/603, 604, 595, 596, 599

[56] References Cited

U.S. PATENT DOCUMENTS 1,038,541  9/1912  Ducker ........................... 123/192 R
1,275,140  8/1918  Dunn .................................. 74/603
1,351,417  8/1920  Dodge ................................ 74/603
1,355,439 10/1920  Weinhardt ........................ 74/603
1,661,341  3/1928  Oldson .............................. 74/603
1,881,027 10/1932  Manning ........................... 74/596

FOREIGN PATENT DOCUMENTS 18185 of 1891  United Kingdom ............ 123/197 R
678677  9/1952  United Kingdom ............ 123/197 R Primary Examiner—Craig R. Feinberg
Assistant Examiner—David A. Okonsky

[57] ABSTRACT

A V-shaped crankarm so arranged, constructed, and mounted that when the piston and piston pin are at top dead center and the greatest resistance to the downstroke is made by the crankarm, the V-crankarm will transfer the force of combustion via a crankpin arm portion, which is fixed at an angle to a crankshaft arm portion lying in a plane substantially perpendicular to the axis of the cylinder, in order to affect rotary motion.

7 Claims, 12 Drawing Figures

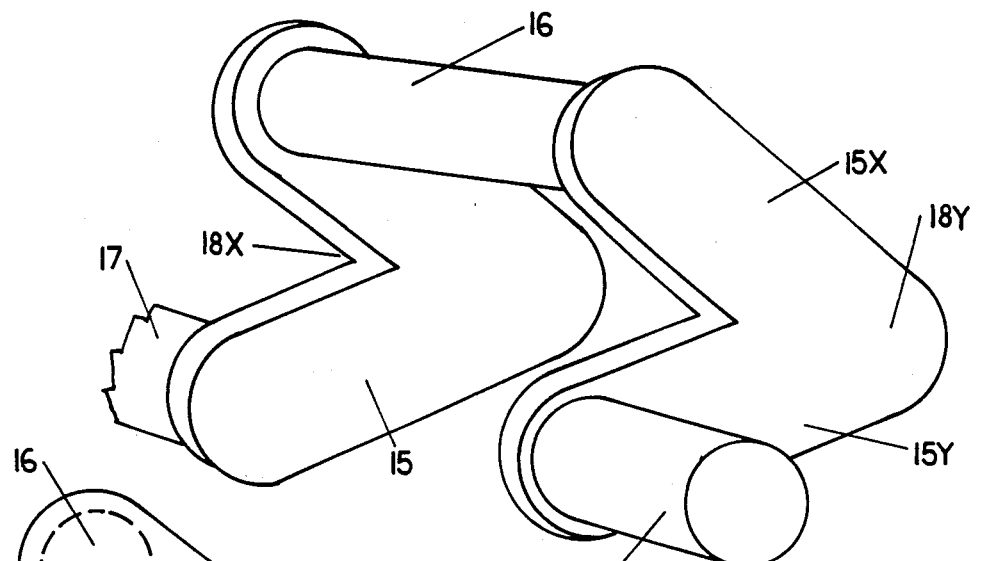
FIG. 1
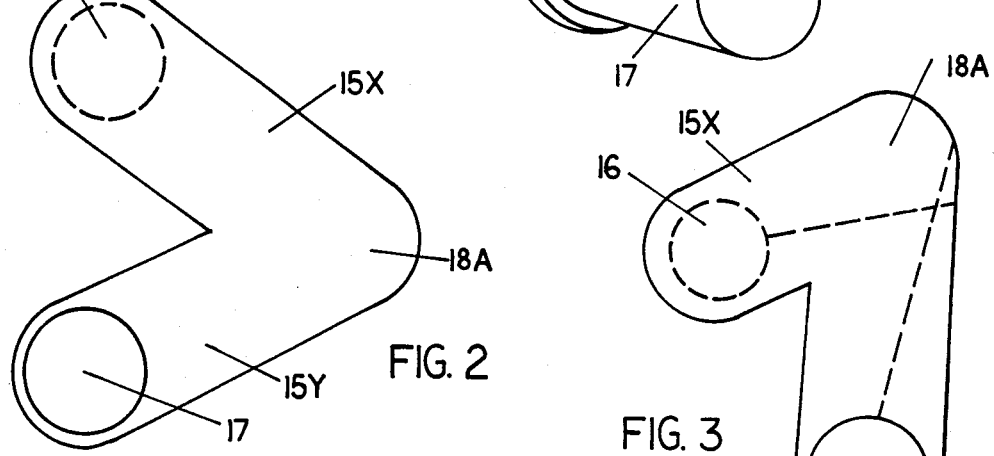
FIG. 2
FIG. 3
FIG. 4
FIG. 5

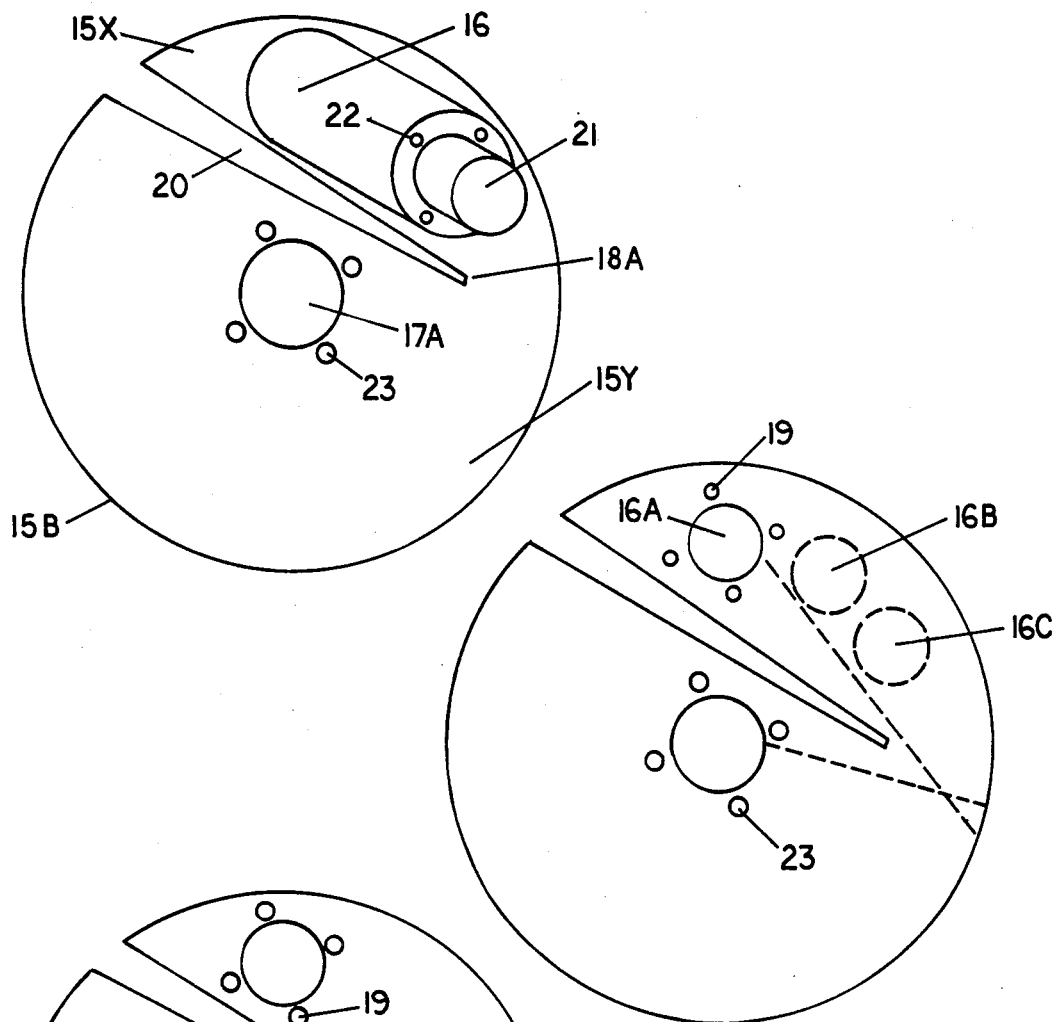
FIG. 6
FIG. 8
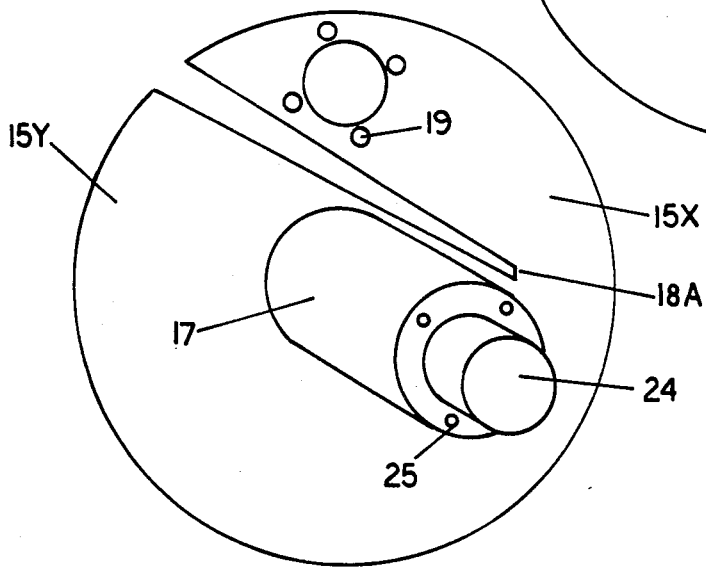
FIG. 7

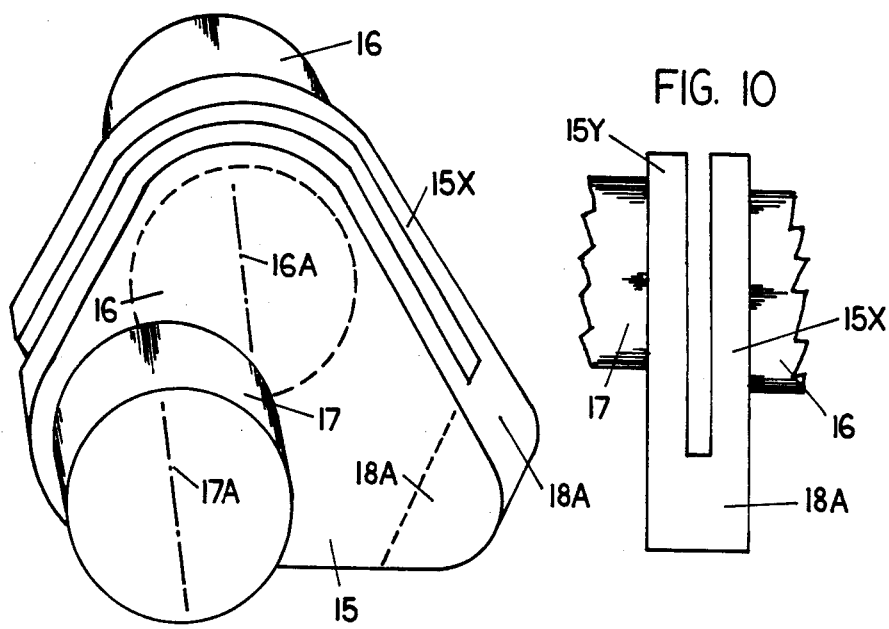
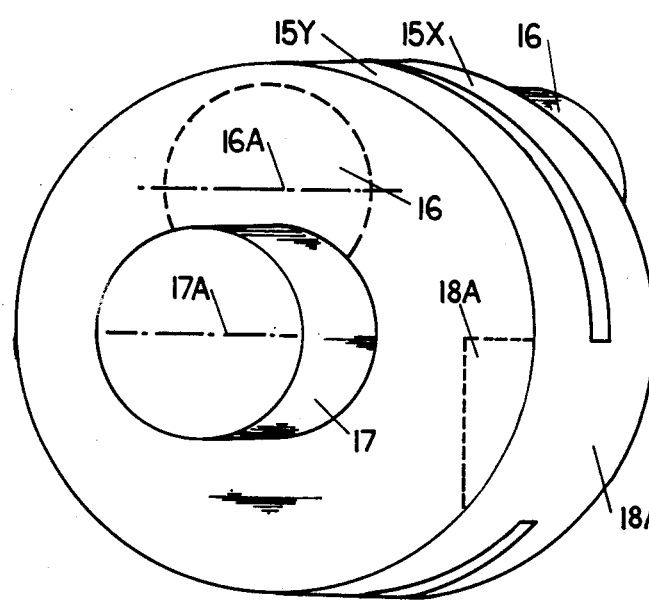
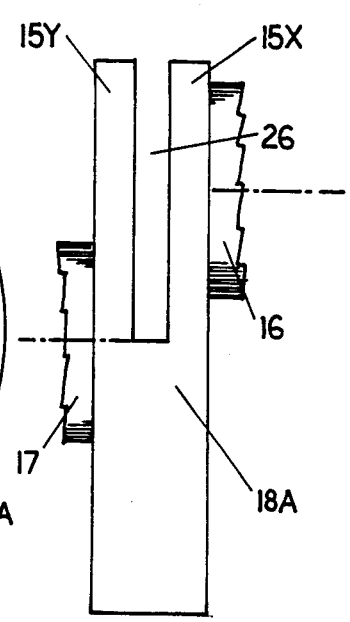

ACUTE ANGLE CRANKARM TRANSMITTING RECIPROCATING MOTION IN A ROTARY FASHION

This is a continuation of application Ser. No. 519,106, filed Aug. 2, 1983, and now U.S. Pat. No. 4,622,932.

This invention relates to engines and more particularly to a V-crankarm. The invention is directed to improving engine performance and to increasing the power output of an engine without adding to the total weight of the engine and without significantly increasing the manufacturing cost.

The engine crankshaft is often regarded as the backbone of an engine; it serves to change the reciprocating motion of the piston into rotary motion.

SUMMARY OF THE INVENTION

An object of my invention is to provide an offset, or V-shaped crankarm so arranged and constructed and mounted that, when the piston pin is top dead center, the power of the piston will be directed to the center of the "V" of the crankarm at an angle from top dead center. The V-center of the crankarm pushes the horizontal "V" arm around the crankshaft thus changing the reciprocal downstroke to the rotary motion.

Another object of the invention is directed to a reciprocating internal combustion engine that directs the top-dead center power stroke to an angle off of the vertically downward stroke.

Another object of my invention is to provide a circular "S" form of a crankarm so arranged and constructed that one end of the circular S is secured to the connecting rod pin and the other end of the S is a weight to balance the crankshaft so as to direct the dead center power stroke away from dead center.

Another object of my invention is a circular "S" form of a crankarm so arranged and constructed that both ends of the S are secured to pins, one pin being on the top of one side and another pin being on the bottom of the opposite side of the S crankarm, thus allowing the crankarm to rotate more freely.

Another object of my invention is a "V" crankarm configured in varied angles, lengths of the V-arms of the crankarm.

Another object of my invention is to improve the volumetric efficiency of an internal combustion engine by providing a "V" shaped crankarm, so that shock is absorbed by the crankarm and impact loads transmitted by the piston are cushioned.

My invention includes a V-crankarm, a circular S crankarm, and a circular V crankarm, all of which will be referred to by the term "V-crankarm".

BRIEF DESCRIPTION OF THE DRAWINGS

FIG. 1 is a perspective view of a V-crankarm according to the present invention showing the crankshaft and crankpins for a one to an eight cylinder engine;

FIG. 2 is a sectional side view of a modified V-crankarm shown in its simplest form with the crankpin arms at about 60 degrees relative to one another;

FIG. 3 is a sectional side view of a V-crankarm with the crankpin arm nearest the piston shorter than the other crankpin arm;

FIG. 4 is a sectional side view of a V-crankarm with the crankpin arm nearest the piston relatively short as compared to the other crankarm;

FIG. 5 is a sectional side view of the V-crankarm having an S-crankarm arrangement;

FIG. 6 is a perspective view of a V-crankarm having a circular arm arrangement showing the crankpin;

FIG. 7 is a perspective view of a V-crankarm having a circular arm arrangement showing the crankarm;

FIG. 8 is a perspective view of a V-crankarm having a circular arm arrangement having openings for adjusting the angle of the crankpin;

FIG. 9 is a perspective view of a V-crankarm having a triangular shaped crankpin arm portion axially spaced froma parallel to a similarly shaped crankshaft arm portion;

FIG. 10 is a side-view of the V-crankarm as shown in FIG. 9;

FIG. 11 is a perspective view of a V-crankarm having a circular shaped crankpin arm portion axially spaced from and parallel to a similarly shaped crankshaft arm portion; and FIG. 12 is side view of the V-crankarm as shown in FIG. 11.

DETAILED DESCRIPTION OF THE INVENTION

Reference is now made in detail to the drawings.

In the embodiments that are to be described, it is to be understood that suitable parts such as shims, keys, keyways, nuts and bolts, and other means of fasteners are used at points where they are needed or are desirable, but in the drawings they have not been shown in all the places where they are used.

FIGS. 1 and 2 illustrate a V-crankarm system 15 having a crankpin 16 attached at one end of V-crankarm system 15 and a crankshaft 17 attached to the other end of V-crankarm system 15. V-crankarm system 15 includes a pair of V-arms 18X and 18Y that are joined by crankpin 16, which is connected in a known manner to the engine portion. Crankshaft 17 likewise is a pair of oppositely positioned crankshafts that extend outwardly from the other ends of paired V-arms 18X and 18Y of V-crankarm system 15. Crankarm system 15 transforms the power received from the piston on its power stroke to the mid-area of the V of V-arms 18X and 18Y from where the power is translated, or transmitted, to crankshaft 17. First pair of crankpin arms 15X are connected to crankpin 16 and second pair of crankshaft arms 15Y are connected to crankshaft 17. Arms 15X and 15Y meet at a V intersection 18A. Note that V intersection 18A pushes arm 15Y around crankshaft 17, thus changing the movement of the reciprocal downstroke to rotary motion.

The power stroke of the piston will be transmitted at a slight forward movement of crankarm 15 at the downstroke of crankpin 16 relative to crankshaft 17 in the present invention because of the angle between arms 15X and 15Y, thus reducing the resistance ordinarily encountered at this point of the power stroke in the prior art. As seen in FIG. 2, the angle between arms 15X and 15Y is about 60 degrees, but this angle may vary in accordance with such factors as strength of the material used. The relative lengths of the crankshaft arm 15Y, and so on.

FIG. 3 illustrates a modification of V-crankarm system 15 shown in FIGS. 1 and 2. V-crankarm system 15 here includes a crank pin 16 extending between crankpin arms 15X and a crankshaft 17 extending between crankshaft arms 15Y. Here, crankpin arm 15X is shorter than crankshaft arm 15Y.

FIG. 4 illustrates another modification of V-crankarm 15 system shown in FIGS. 1 and 2. V-crankarm system 15 here includes a crankpin 16 extending between crankpin arm 15X and a crankshaft 17 extending between crankshaft arms 15Y. Here, crankpin arm 15X is shorter than crankshaft arm 15Y of FIGS. 1 and 2 and even shorter than crankshaft arm of FIG. 3.

FIG. 5 illustrates a modified circular S-crankarm system 15A that is an interior crankarm for a multiple cylinder engine. In its simplest form S-crankarm system 15A is a V crankarm 15 according to the present invention modified to the circular S.

A pair of crankpins 16 are connected to the ends of a pair of crankpin arms 15X that are the opposed outer elements of S-crankarm system 15A. A crankshaft 17 is seen at the center of S-crankarm system 15A. Crankshaft 17 is not mounted to S-crankarm system 15A, although it is driven by S-crankarm system 15A by way of an adjoining V-crankarm (not shown). Each of arms 15X and 15Y intersect at V-type connections 18A.

FIGS. 6, 7 and 8 illustrate a circular crankarm system 15B embodied as a metal flywheel. Crankarm system 15B is divided by a V-cut 20 into crankarm sections 15X and 15Y. Crankpin openings 16A, 16B and 16C formed through section 15X of FIG. 8 are each adapted to hold crankpin 16 at varied length of the crankpin arm portion nearest the piston. Openings 16B and 16C are shown in phantom. A crankshaft opening 17A is also shown in FIGS. 6 and 8 at the center of crankarm system 15B, in particular in crankshaft section 15Y. FIG. 6 shows crankpin 16 mounted in crankpin hole 16A. A crankpin boss 21 extends outwardly from pin 16.

Bolt taps 19 are formed around crank pin hole 16A (and 16B and 16C). Bolt taps 22 are formed in crankpin 16 at its flange with crankpin boss 21, which in turn is adapted to fit into holes 16A, 16B, or 16C. Bolt taps 19 and 22 are aligned for receipt of common bolts. FIGS. 6 and 8 show bolt tap holes 23 formed around center crankshaft hole 17A.

FIG. 7 illustrates crankshaft 17 positioned in crankshaft hole 17A. A crankshaft boss 24 extends from the end of crankshaft 17. Boss 24 is adapted to fit into crankshaft hole 17A. Crankshaft taps 25 formed around crankshaft 17 are aligned with bolt taps 23 for mounting by common bolts.

In the embodiment of FIG. 6, 7, and 8, crankshaft section 15Y is analagous to crankshaft arm 15Y of FIGS. 1-4 and crankpin section 15X is analogous to crankpin arms 15X of FIGS. 1-4. Thus, power from crankpin 16 is transmitted to V intersection 18A, which in turn pushes crankpin arm 15X around crankshaft 17 at a power angle that directs the power stroke somewhat forward of the direct line of force between the crankpin and the crankshaft current in the art thus changing the downstroke to rotary motion.

In the embodiment of FIGS. 9 and 10, as well as that of FIGS. 11 and 12, the crankpin arm portions 15X are axially spaced from and parallel to the crankshaft arm portions 15Y. In each of these embodiments the crankarms 15X and 15Y are rigidly connected via connecting portions 18A. As in each of the prior embodiments, the force due to combustion is transferred along a connecting rod (not shown) and to the crankpin 16 wherein it is transferred to the connecting portion 18A. As noted in each of FIGS. 9 and 11 the crankpin central axis 16A is offset from that of the crankshaft central axis 17A as viewed in cross section. Thus, the crankpin arm portions 15X and crankshaft arm portions 15Y of FIGS. 9 and 11 are analogous to the crankpin arm portions 15X and crankshaft arm portions 15Y of FIGS. 1-4. The manufacture of the V-crankarms of FIGS. 9 and 11 can be quite diverse from that of the prior embodiments in that the arm portions are created by a cutting tool which passes through the component part thereby forming groove 26 as shown in FIG. 12.

It is to be understood that the invention is not to be limited to the embodiments herein set forth, but that the various modifications and changes that will occur to persons skilled in the art are to be regarded as being within the scope of the invention and as defined by the appended figures.

What is claimed is:

1. A crankarm system for translating the force of a piston of an internal combustion engine into rotating a crankshaft, comprising, in combination, a crankpin connected to said piston, a pair of spaced crankarms, each crankarm having a crankpin arm portion and a crankshaft arm portion, said crankpin arm portion having a crankpin end connected to said crankpin and an opposed connecting end, said crankshaft arm portion having a crankshaft end aligned with said crankshaft and an opposed connecting end, said crankpin arm portion and said crankshaft arm portion being connected at an angle at said connecting ends, means for connecting said crankarm to said crankshaft, wherein each of said crankarms is configured as a circular member having a center and perimeter, said crankshaft being positioned transverse to said circular member at said center, said crankpin being positioned transverse to said circular member proximate to said perimeter, an imaginary radial line extending between said center and said crankpin, said circular member forming a V-cut extending from said perimeter between said center and said crankpin past said radial line dividing said circular member into an outer portion relative to said center and a primary portion containing said center, said center portion being said crankshaft arm portion.

2. A crankarm system for translating the force of a piston of an internal combustion engine into rotating a crankshaft, comprising, in combination, a crankpin connected to said piston, a pair of spaced crankarms, each crankarm having a crankpin arm portion and a crankshaft arm portion, said crankpin arm portion having a crankpin end connected to said crankpin and an opposed connecting end, said crankshaft arm portion having a crankshaft end aligned with said crankshaft and an opposed connecting end, said crankpin arm portion being connected at an angle at said connecting ends, means for connecting said crankarms to said crankshaft wherein each of said crankarms is configured as a circular member having a center and a perimeter, said crankshaft being positioned transverse to said circular member at said center, said crankpin being positioned transverse to said circular member proximate to said perimeter, an imaginary radial line extending between said center and said crankpin, said circular member forming a V-cut extending from said perimeter between said center and said crankpin past said radial line dividing said circular member into an outer portion relative to said center and a primary portion containing said center, said center portion being said crankshaft arm portion and wherein said circular member forms a plurality of apertures in said center portion adapted to position said crankpin at a plurality of related positions at a selected power angle, said power angle being the angle formed between said radial line and the factual line of force created in said outer portion between said crankpin and said perimeter.

3. A Crankarm system for translating the force of a piston of an internal combustion engine into rotating a crankshaft about a rotational axis, comprising, in combination, a crankpin connected to said piston, a pair of space crankarms, each crankarm having a crankpin arm portion and a crankshaft arm portion, said crankpin arm portion having a crankpin part connected to said crankpin and an adjacent connecting part, said crankshaft arm portion having a crankshaft part aligned with said crankshaft and an adjacent connecting part, said crankpin arm portion being parallel to and axially spaced from said crankshaft arm portion with respect to said rotational axis, said crankpin arm portion and said crankshaft arm portion being rigidly connected only at said connecting parts, and means for connecting said crankarms to said crankshaft.

4. A crankshaft system according to claim 3, wherein each of said crankarms are of similar shape and dimension.

5. A crankshaft system according to claim 4, wherein each of said crankarms are substantially circular in cross section as viewed along said crankshaft rotational axis.

6. A crankshaft system according to claim 3, wherein said crankpin has a longitudinal axis, said crankpin longitudinal axis being parallel to said crankshaft rotational axis.

7. A crankshaft system according to claim 4, wherein each of said crankarms are substantially triangular in cross section as viewed along said crankshaft rotational axis.

* * * * *